(12) United States Patent
Solfrank et al.

(10) Patent No.: US 8,191,527 B2
(45) Date of Patent: Jun. 5, 2012

(54) COMPENSATION SHAFT OF A MULTI-CYLINDER ENGINE

(75) Inventors: Peter Solfrank, Frensdorf (DE); Patrick Ullmann, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 749 days.

(21) Appl. No.: 12/322,229

(22) Filed: Jan. 30, 2009

(65) Prior Publication Data
US 2009/0205602 A1  Aug. 20, 2009

(30) Foreign Application Priority Data

Feb. 16, 2008  (DE) .......................... 10 2008 009 557

(51) Int. Cl.
*F02B 75/06* (2006.01)
(52) U.S. Cl. ...................................... 123/192.2; 74/603
(58) Field of Classification Search ............... 123/192.2; 74/603, 604
See application file for complete search history.

(56) References Cited

U.S. PATENT DOCUMENTS

| | | | | |
|---|---|---|---|---|
| 6,286,474 | B1 * | 9/2001 | Downs et al. ............... | 123/192.2 |
| 7,506,628 | B2 * | 3/2009 | Marzy et al. ............... | 123/192.2 |
| 7,571,703 | B2 * | 8/2009 | Reichweger et al. ...... | 123/192.2 |

* cited by examiner

*Primary Examiner* — Noah Kamen
(74) *Attorney, Agent, or Firm* — Volpe and Koenig, P.C.

(57) ABSTRACT

A compensation shaft for a multi-cylinder engine at least two bearing pegs and at least four unbalanced weight sections, two of the at least four unbalanced weight sections being arranged respectively, around each of the at least two bearing pegs, so that at least two units are formed, these at least two units being connected to each other by a connecting part, wherein two of the unbalanced weight sections are arranged asymmetrically around each of the two bearing pegs, and the connecting part is configured as a flexurally rigid and torsion-proof component.

4 Claims, 2 Drawing Sheets

COMPENSATION SHAFT OF A MULTI-CYLINDER ENGINE

FIELD OF THE INVENTION

The invention concerns a compensation shaft for a multi-cylinder engine, said compensation shaft comprising at least two bearing pegs and at least four unbalanced weight sections, two of the at least four unbalanced weight sections being arranged respectively around each of the at least two bearing pegs, so that at least two units are formed, these at least two units being connected to each other by a connecting part.

BACKGROUND OF THE INVENTION

During the operation of an internal combustion piston engine, gas and mass forces are produced per cylinder and, in the end, cause a resulting piston force. These resulting piston forces, in their turn, overlap each other differently depending on the number and arrangement of the cylinders along the crankshaft of the internal combustion engine and, depending on the manner of overlap, they cause free forces and torques. These free forces and torques add to the loading of the engine supports, reduce comfort and produce noises. For this reason, compensation shafts are increasingly used in present-day internal combustion engines in which free forces and torques occur. These compensation shafts comprise weight sections that cause controlled states of imbalance to compensate the free forces and torques. For this purpose, the compensation shafts are operated at the same speed of rotation or at double the speed of rotation of the crankshaft, depending on whether forces or torques of the first or the second order have to be compensated for. Thus, it is possible in this way to improve the smoothness of running of a multi-cylinder engine.

PRIOR ART

DE 10 2004 014 014 A1 discloses a compensation shaft of the pre-cited type comprising unbalanced weight sections that are arranged in pairs symmetrically around an associated bearing peg. These units made up of one bearing peg und two symmetrically arranged unbalanced weight sections are connected to each other by flexible connecting parts to allow an undisturbed excursion of the unbalanced weight sections and to thus avoid a tilting of the bearing peg in its mounting location in the engine which would increase the mechanical loading of the mounting.

This advantageous effect of the flexible connecting part, however, is only obtained with a symmetrical configuration of the unbalanced weight sections arranged next to the associated bearing peg. However, it is not always possible to realize such a configuration of the compensation shaft due to the generally given narrow limits of the compensation shaft design space.

OBJECTS OF THE INVENTION

It is therefore an object of the invention to provide a compensation shaft for a multi-cylinder engine in which, despite the given restrictions of the shaft design space, a tilting of the bearing pegs in the associated mounting locations in the engine is minimized.

This and other objects and advantages of the invention will become obvious from the following detailed description.

SUMMARY OF THE INVENTION

The invention achieves the above objects by the fact that two of the unbalanced weight sections are arranged asymmetrically around each of the two bearing pegs, and the connecting part is configured as a flexurally rigid and torsion-proof component. This has the advantage that the configuration of the compensation shaft with regard to the arrangement of the unbalanced weight sections can be made to comply with the design space conditions and flexion of the shaft is reduced due to the flexurally rigid component. This results in a reduced tilting of the mounting.

In a further development of the invention, the connecting part is configured in form of a rectangular cross-section oriented in direction of the unbalanced weight sections. Through this measure, due to the high axial geometrical moment of inertia of the connecting part in direction of the unbalanced weight sections, a bending of the shaft is effectively prevented.

Alternatively, the connecting part may also be configured in form of a double-T profile oriented in direction of the unbalanced weight sections. Compared to the rectangular profile, this has the advantage that with equally large profile cross-sections an additional rigidity can be achieved in bending direction, or with an equal rigidity, a saving of weight is achieved.

According to further alternative configurations of the invention, the connecting part may also have an oval shape oriented in direction of the unbalanced weight sections or a shape of a polygon oriented in direction of the unbalanced weight masses.

By the term "oriented in direction of the unbalanced weight masses" is to be basically understood that the connecting part possesses a rotationally non-symmetric profile cross-section whose largest dimension extends parallel to the direction of the unbalanced weight sections.

According to a further development of the invention, the compensation shaft is made of a forged steel material. Through this measure, the compensation shaft can be made in a simple manner and at low costs of manufacture.

According to a final feature of the invention, rolling bearings are provided in a region of the at least two bearing pegs. This has the advantage of permitting a robust and low-friction mounting of the compensation shaft.

Further measures of improvement of the invention are described more closely in the following together with the description of preferred examples of embodiment of the invention with reference to the appended figures.

EXAMPLES OF EMBODIMENT

DETAILED DESCRIPTION OF THE DRAWINGS

Figure 1:
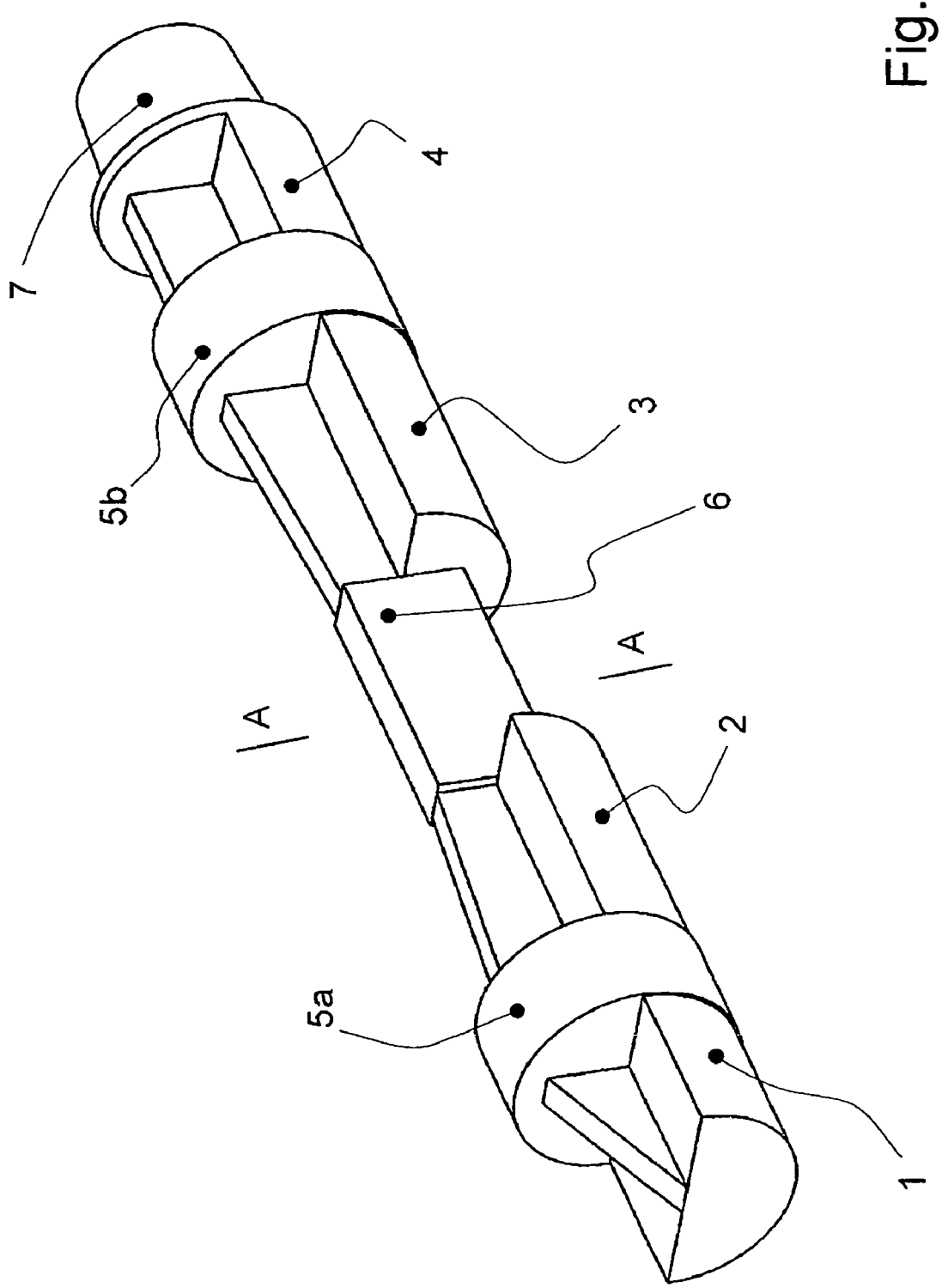
FIG. 1 is a perspective view of the compensation shaft of the invention.

FIG. 1 shows a perspective view of the compensation shaft of the present invention that comprises unbalanced weight sections 1, 2, 3 and 4. The unbalanced weight sections 1 and 2 are arranged on the two sides of a bearing peg 5a, while the unbalanced weight sections 3 and 4 are disposed on the two sides of a bearing peg 5b. With respect to their length along the axis of rotation of the compensation shaft, the unbalanced weight sections 1, 2, 3 and 4 are differently configured: the unbalanced weight section 2 has a larger length than the unbalanced weight section 1, while the unbalanced weight section 3 has a larger length than the unbalanced weight section 4. In both cases, this results in an asymmetric arrangement on the two sides of the bearing pegs 5a and 5b and would lead to a tilting of the mounting during rotation of the compensation shaft. For this reason, a flexurally rigid and torsion-proof connecting part 6, which, during rotation of the compensation shaft, diminishes the flexion of the compensation shaft and thus reduces the tilting of the mounting at the bearing pegs 5a and 5b, is arranged between the unbalanced weight section 2 and the unbalanced weight section 3. Adjoining the unbalanced weight section 4, the compensation shaft further comprises a shaft journal 7 on which a gearwheel or a belt wheel is arranged for connecting the compensation shaft to the crankshaft of the internal combustion engine. It will be clear to a person skilled in the art, that such a connection can be realized through a gearwheel drive, a chain drive or a traction drive. Furthermore, rolling bearings are arranged in the region of the bearing pegs 5a and 5b for mounting the compensation shaft. The person skilled in the art will see clearly that the use of sliding bearings for this purpose is also conceivable.

Figure 2A:
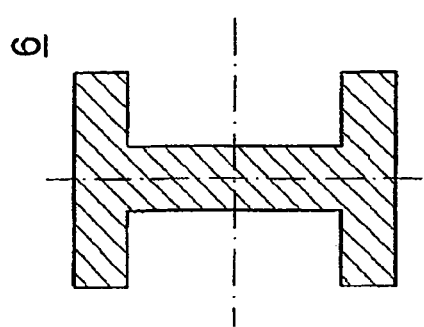
FIG. 2a is a sectional view showing a cross-section of a connecting part of the invention, taken along the line of section A-A of FIG. 1.
Figure 2C:
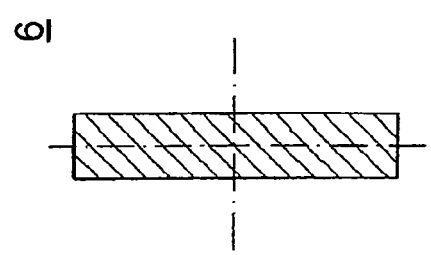
FIG. 2c is a sectional view showing a cross-section of another embodiment of the connecting part of the invention, taken along the line of section A-A of FIG. 1.
Figure 2B:
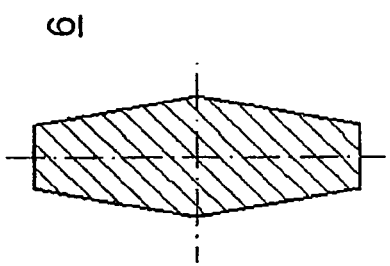
FIG. 2b is a sectional view showing a cross-section of another embodiment of the connecting part of the invention, taken along the line of section A-A of FIG. 1.
Figure 2D:
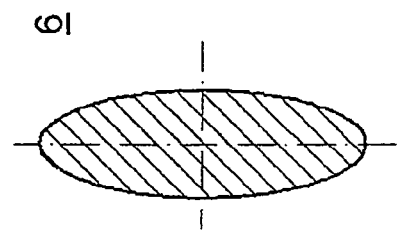
FIG. 2d is a sectional view showing a cross-section of still another embodiment of the connecting part of the invention, taken along the line of section A-A of FIG. 1

FIGS. 2a to 2d show possible cross-sections of the flexurally rigid and torsion-proof connecting part 6, in sectional views taken along the line of section A-A of FIG. 1. FIG. 2a shows a rectangular cross-section, FIG. 2b a double-T cross-section, FIG. 2c an oval cross-section and FIG. 2d a polygonal cross-section. All the cross-sections are oriented with their largest dimension in direction of the unbalanced weight sections.

LIST OF REFERENCE NUMERALS

1 First unbalanced weight section
2 Second unbalanced weight section
3 Third unbalanced weight section
4 Fourth unbalanced weight mass
5a Bearing peg
5b Bearing peg
6 Connecting part
7 Shaft journal

The invention claimed is:

1. A compensation shaft for a multi-cylinder engine, said compensation shaft comprising at least two bearing pegs and at least four unbalanced weight sections two of the at least four unbalanced weight sections being arranged respectively around each of the at least two bearing pegs, so that at least two units are formed, these at least two units being connected to each other by a connecting part, wherein two of the unbalanced weight sections are arranged asymmetrically around each of the two bearing pegs, and the connecting part is configured as a flexurally rigid and torsion-proof component in form of a rectangular cross-section oriented in direction of the unbalanced weight sections.

2. A compensation shaft for a multi-cylinder engine, said compensation shaft comprising at least two bearing pegs and at least four unbalanced weight sections two of the at least four unbalanced weight sections being arranged respectively around each of the at least two bearing pegs, so that at least two units are formed, these at least two units being connected to each other by a connecting part, wherein two of the unbalanced weight sections are arranged asymmetrically around each of the two bearing pegs, and the connecting part is configured as a flexurally rigid and torsion-proof component.

3. A compensation shaft for a multi-cylinder engine, said compensation shaft comprising at least two bearing pegs and at least four unbalanced weight sections two of the at least four unbalanced weight sections being arranged respectively around each of the at least two bearing pegs, so that at least two units are formed, these at least two units being connected to each other by a connecting part, wherein two of the unbalanced weight sections are arranged asymmetrically around each of the two bearing pegs, and the connecting part is configured as a flexurally rigid and torsion-proof component.

4. A compensation shaft for a multi-cylinder engine, said compensation shaft comprising at least two bearing pegs and at least four unbalanced weight sections two of the at least four unbalanced weight sections being arranged respectively around each of the at least two bearing so that at two units are formed, these at least two units being connected to each other by a connecting part, wherein two of the unbalanced weight sections are arranged asymmetrically around each of the two bearing pegs, and the connecting part is configured as a flexurally rigid and torsion-proof component.

* * * * *